(12) United States Patent
Chaudhary et al.

(10) Patent No.: US 11,840,616 B2
(45) Date of Patent: Dec. 12, 2023

(54) ETHYLENE-BASED POLYMER COMPOSITION CONTAINING A TRIORGANOPHOSPHINE

(71) Applicants: Dow Global Technologies LLC, Midland, MI (US); Georgia Tech Research Corporation, Atlanta, GA (US)

(72) Inventors: Bharat I. Chaudhary, Collegeville, PA (US); Jeffrey M. Cogen, Collegeville, PA (US); Charles Liotta, Sandy Springs, GA (US); Pamela Pollet, Atlanta, GA (US); Sarath Sarngadharan, Pattazhy (IN)

(73) Assignees: Dow Global Technologies LLC, Midland, MI (US); Georgia Tech Research Corporation, Atlanta, GA (US)

( * ) Notice: Subject to any disclaimer, the term of this patent is extended or adjusted under 35 U.S.C. 154(b) by 361 days.

(21) Appl. No.: 17/273,632

(22) PCT Filed: Sep. 19, 2019

(86) PCT No.: PCT/US2019/050748
§ 371 (c)(1),
(2) Date: Mar. 4, 2021

(87) PCT Pub. No.: WO2020/056088
PCT Pub. Date: Mar. 19, 2020

(65) Prior Publication Data
US 2021/0340357 A1  Nov. 4, 2021

Related U.S. Application Data

(60) Provisional application No. 62/730,731, filed on Sep. 13, 2018.

(51) Int. Cl.
*H01B 3/44* (2006.01)
*C08K 13/00* (2006.01)
*C09D 123/06* (2006.01)

(52) U.S. Cl.
CPC ............ *C08K 13/00* (2013.01); *C09D 123/06* (2013.01); *H01B 3/441* (2013.01)

(58) Field of Classification Search
CPC . H01B 7/02; H01B 7/295; H01B 7/04; H01B 7/08; H01B 11/02; C08F 4/44; C08K 5/372; C08K 5/005; C08K 5/14; C08K 5/49
USPC ...................... 174/110–110 N, 120 R–122 SR
See application file for complete search history.

(56) References Cited

U.S. PATENT DOCUMENTS

| | | | |
|---|---|---|---|
| 3,153,639 A * | 10/1964 | Kraus | C08C 19/24 |
| | | | 525/332.5 |
| 3,637,907 A | 1/1972 | Mathis et al. | |
| 5,246,783 A | 9/1993 | Spenadel et al. | |
| 5,677,383 A | 10/1997 | Chum et al. | |
| 5,783,638 A | 7/1998 | Lai et al. | |
| 6,111,023 A | 8/2000 | Chum et al. | |
| 6,496,629 B2 | 12/2002 | Ma et al. | |
| 6,714,707 B2 | 3/2004 | Rossi et al. | |
| 6,984,695 B2 | 1/2006 | Brown et al. | |
| 2004/0048994 A1* | 3/2004 | Rhodes | C08F 32/00 |
| | | | 526/171 |
| 2016/0251535 A1 | 9/2016 | Chaudhary | |
| 2018/0215899 A1* | 8/2018 | Cogen | C08K 5/49 |
| 2019/0023872 A1 | 1/2019 | Messana et al. | |

FOREIGN PATENT DOCUMENTS

| | | | | |
|---|---|---|---|---|
| CN | 103602135 A | 2/2014 | | |
| CN | 104311917 A | 1/2015 | | |
| CN | 104788867 A | 7/2015 | | |
| CN | 105482231 A | 4/2016 | | |
| WO | WO 2010/000477 A1 * | 1/2010 | ............ | C08F 255/02 |
| WO | 2016/140360 A1 | 9/2016 | | |

(Continued)

OTHER PUBLICATIONS

W.L. Hawkins et al., Journal of Polymer Science: Part A, vol. 1, pp. 3499-3509 (1963).

(Continued)

*Primary Examiner* — William H. Mayo, III
(74) *Attorney, Agent, or Firm* — Boyle Fredrickson, S.C.

(57) ABSTRACT

The composition includes: (i) an ethylene-based polymer; (ii) an organic peroxide, (iii) a triorganophosphine, and (iv) a protic acid-source compound ("PASC") selected from a protic acid, a protic acid-generator compound ("PAGC"), and combinations thereof. The triorganophosphine has the Structure (1):

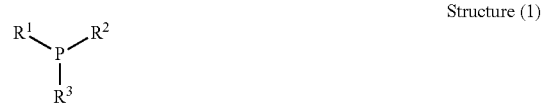

Structure (1)

wherein $R^1$, $R^2$, and $R^3$ each is independently selected from a $C_1$-$C_{40}$ hydrocarbyl group, a $C_1$-$C_{40}$ heterohydrocarbyl group, and combinations thereof;
with the proviso that the phosphorus atom is bound to a carbon atom in each of $R^1$, $R^2$, and $R^3$.

17 Claims, No Drawings

(56) References Cited

FOREIGN PATENT DOCUMENTS

WO     WO 2016/204950 A1 * 12/2016   ............... C08K 5/14
WO     WO 2016/204951 A1 * 12/2016   ............... C08K 5/14

OTHER PUBLICATIONS

Foldes et al., Polymer Degradation and Stability 91 (2006), 479-487.
M. Conley et al., Ind. Eng. Chem. Res. 2016, 55, 5865-5873.
M.S. Kharasch et al., J. Org. Chem., 15 (4), 748-752 (1950).
J.C. Forsyth et al., Journal of Polymer Science: Part A: Polymer Chemistry, vol. 35, 3517-3525 (1997).
Dannenberg et al., Journal of Polymer Science, vol. XXXI, pp. 127-153 (1958).
D.E. Bergbreiter et al., J. Org. Chem., 1989, 54, 2726-2730.
D.E. Bergbreiter et al., Reactive Polymers, 12 (1990) 291-295.

* cited by examiner

ETHYLENE-BASED POLYMER COMPOSITION CONTAINING A TRIORGANOPHOSPHINE

FIELD

The present disclosure relates to crosslinkable compositions and coated conductors including the same.

SUMMARY

Crosslinkable compositions containing an ethylene-based polymer and an organic peroxide are frequently used to form coatings, and particularly insulation or jacket layers, for wires and cables. However, protic acids that can be contained in or generated from additives such as antioxidants in crosslinkable compositions are known to cause premature decomposition of the organic peroxide via a pathway that is nonproductive for crosslinking the crosslinkable composition. That is, as the composition is stored over time, or as the composition is extruded onto a conductor, the organic peroxide decomposes in an ionic pathway that does not lead to the desired free radical crosslinking reaction. Without retaining a sufficient amount of organic peroxide in the composition during storage and extrusion, the composition cannot crosslink during a subsequent continuous vulcanization step that occurs after extrusion to make a coated conductor, making the coated conductor unsuitable for wire and cable applications.

We recognize the need for a coating composition containing an ethylene-based polymer, an organic peroxide, and a protic acid source compound that is suitable for wire and cable applications. We further recognize the need for a coating composition containing an ethylene-based polymer, an organic peroxide, and a protic acid source compound that prevents, or slows, the ionic decomposition of the organic peroxide during storage or at extrusion temperatures of about 140° C. or less, such that the composition retains a suitable amount of organic peroxide to subsequently enable crosslinking of the coating composition during continuous vulcanization (at temperatures greater than about 140° C.).

The present disclosure provides a composition. The composition includes: (i) an ethylene-based polymer; (ii) an organic peroxide, (iii) a triorganophosphine, and (iv) a protic acid-source compound ("PASC") selected from a protic acid, a protic acid-generator compound ("PAGC"), and combinations thereof. The triorganophosphine has the Structure (1):

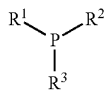

Structure (1)

wherein $R^1$, $R^2$, and $R^3$ each is independently selected from a $C_1$-$C_{40}$ hydrocarbyl group, a $C_1$-$C_{40}$ heterohydrocarbyl group, and combinations thereof;
with the proviso that the phosphorus atom is bound to a carbon atom in each of $R^1$, $R^2$, and $R^3$.

The present disclosure also provides a crosslinked product made by heating the composition to a temperature sufficient to crosslink the composition. The crosslinked product may be a coating on a conductor.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

Any examples disclosed herein are nonlimiting.

"Alkyl" and "alkyl group" refer to a saturated linear, cyclic, or branched hydrocarbon group.

"Alpha-olefin," "α-olefin" and like terms refer to a hydrocarbon molecule or a substituted hydrocarbon molecule (i.e., a hydrocarbon molecule comprising one or more atoms other than hydrogen and carbon, e.g., halogen, oxygen, nitrogen, etc.), the hydrocarbon molecule comprising (i) only one ethylenic unsaturation, this unsaturation located between the first and second carbon atoms, and (ii) at least 2 carbon atoms, or 3 to 20 carbon atoms, or 4 to 10 carbon atoms, or 4 to 8 carbon atoms. Examples of α-olefins include ethylene, propylene, 1-butene, 1-pentene, 1-hexene, 1-octene, 1-dodecene, and mixtures of two or more of these monomers.

"Antioxidant" refers to types or classes of chemical compounds that are capable of being used to minimize the oxidation that can occur during the processing of polymers.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

A "cable" is at least one conductor, e.g., wire, optical fiber, etc., within a protective insulation, jacket, sheath. A cable may be two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707. The cable can be designed for low, medium, and/or high voltage applications.

"Carboxylic acid" is an organic acid containing a carboxyl group (—COOH).

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "conductor" is one or more wire(s), or one or more fiber(s), for conducting heat, light, and/or electricity at any voltage (DC, AC, or transient). The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath. The conductor may be a single cable or a plurality of cables bound together (i.e., a cable core, or a core).

"Crosslinkable" and "curable" indicate that a polymer, before or after shaped into an article, is not cured or crosslinked and has not been subjected or exposed to treatment that has induced substantial crosslinking even though the polymer may comprise additive(s) or functionality that will effectuate substantial crosslinking upon subjection or exposure to such treatment (e.g., exposure to heat). Crosslinkability of a polymer or composition may be assessed by testing in a Moving Die Rheometer (MDR) at elevated temperatures, and measuring the changes in elastic torque.

"Crosslinked" and similar terms indicate that a polymer composition, before or after it is shaped into an article, has xylene or decalin extractables of less than or equal to 90 weight percent (i.e., greater than or equal to 10 weight percent gel content).

"Cured" and similar terms indicate that a polymer, before or after it is shaped into an article, was subjected or exposed to a treatment which induced crosslinking.

An "ethylene-based polymer," "ethylene polymer," or "polyethylene" is a polymer that contains equal to or greater than 50 wt %, or a majority amount of polymerized ethylene based on the weight of the polymer, and, optionally, may comprise one or more comonomers. The generic term "ethylene-based polymer" thus includes ethylene homopolymer and ethylene interpolymer. A suitable comonomer is an alpha-olefin. "Ethylene-based polymer" and the term "polyethylene" are used interchangeably. Examples of ethylene-based polymer (polyethylene) include low density polyethylene (LDPE) and linear polyethylene. Examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations. Polyethylene may also be produced in a high pressure reactor without a catalyst.

An "ethylene/α-olefin polymer" is an polymer that contains a majority amount of polymerized ethylene, based on the weight of the polymer, and one or more α-olefin comonomers.

"Ethylene multi-block interpolymer," "ethylene multi-block copolymer," (or "OBC") and like terms refer to an ethylene-based polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block copolymers of the prior art, including copolymers produced by sequential monomer addition, fluxional catalysts, or anionic polymerization techniques, the multi-block copolymers are characterized by unique distributions of both polymer polydispersity (PDI or $M_w/M_n$ or MWD), block length distribution, and/or block number distribution, due, in a preferred embodiment, to the effect of the shuttling agent(s) in combination with multiple catalysts used in their preparation. Representative ethylene multi-block interpolymers include the ethylene multi-block interpolymers manufactured and sold by The Dow Chemical Company under the trademark INFUSE™.

"Ethylene plastomers/elastomers" are substantially linear, or linear, ethylene/α-olefin copolymers containing homogeneous short-chain branching distribution comprising units derived from ethylene and units derived from at least one C3-C10 α-olefin comonomer, or at least one C4-C8 α-olefin comonomer, or at least one C6-C8 α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"Functional group" and like terms refer to a moiety or group of atoms responsible for giving a particular compound its characteristic reactions. Examples of functional groups include heteroatom-containing moieties, oxygen-containing moieties (e.g., hydrolysable silane, alcohol, aldehyde, ester, ether, ketone, and peroxide groups), and nitrogen-containing moieties (e.g., amide, amine, azo, imide, imine, nitrate, nitrile, and nitrite groups).

A "heteroatom" is an atom other than carbon or hydrogen. The heteroatom can be a non-carbon atom from Groups IV, V, VI and VII of the Periodic Table. Examples of heteroatoms include: F, N, O, P, B, S, and Si.

"High density polyethylene" (or "HDPE") is an ethylene homopolymer or an ethylene/α-olefin copolymer with at least one C4-C10 α-olefin comonomer, or C4 α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

The terms "hydrocarbyl group" and "hydrocarbon" refer to substituents containing only hydrogen and carbon atoms, including branched or unbranched, saturated or unsaturated, cyclic, polycyclic or noncyclic species. Examples include alkyl-, cycloalkyl-, alkenyl-, alkadienyl-, cycloalkenyl-, cycloalkadienyl-, aryl-, and alkynyl-groups. The term "heterohydrocarbyl group" refers to substituents containing hydrogen atoms, carbon atoms, and heteroatoms, including branched or unbranched, saturated or unsaturated, cyclic, polycyclic or noncyclic species.

A "jacket" is an outermost coating on the conductor.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.916 g/cc to 0.925 g/cc. Examples of LLDPE include TUFLIN™ linear low density polyethylene resins (available from The Dow Chemical Company), DOWLEX™ polyethylene resins (available from the Dow Chemical Company), MARLEX™ polyethylene (available from Chevron Phillips), and AXELERON™ GP 6059 CPD (available from The Dow Chemical Company).

"Low density polyethylene" (or "LDPE") is an ethylene homopolymer, or an ethylene/α-olefin copolymer comprising at least one $C_3$-$C_{10}$ α-olefin, or a $C_3$-$C_4$ α-olefin, that has a density from 0.915 g/cc to 0.925 g/cc and contains long chain branching with broad MWD. LDPE is typically produced by way of high pressure free radical polymerization (tubular reactor or autoclave with free radical initiator). Examples of LDPE include MarFlex™ (Chevron Phillips), LUPOLEN™ (LyondellBasell), as well as LDPE products from Borealis, Ineos, ExxonMobil, and others.

"Medium density polyethylene" (or "MDPE") is an ethylene homopolymer, or an ethylene/α-olefin copolymer comprising at least one $C_3$-$C_{10}$ α-olefin, or a $C_3$-$C_4$α-olefin, that has a density from 0.926 g/cc to 0.940 g/cc. Examples of suitable MDPE include AXELERON™ FO 6548 BK CPD, AXELERON™ FO 6549 NT CPD, AXELERON™ FO 8864 NT CPD, and AXELERON™ FO 8864 BK CPD, each available from The Dow Chemical Company.

"Multi-component ethylene-based copolymer" (or "EPE") comprises units derived from ethylene and units derived from at least one C3-C10 α-olefin comonomer, or at least one C4-C8 α-olefin comonomer, or at least one C6-C8 α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains equal to or greater than 50 wt %, or a majority amount of polymerized olefin monomer (based on the weight of the polymer), and optionally, may contain at least one comonomer. Examples of α-olefin monomer include $C_2$, or $C_3$ to $C_4$, or $C_6$, or $C_8$, or Cm, or $C_{12}$, or Cm, or $C_{18}$, or $C_{20}$ α-olefins, such as ethylene, propylene, 1-butene, 1-hexene, 4-methyl-1-pentene, and 1-octene. Examples of an olefin-based polymer include an ethylene-based polymer and a propylene-based polymer.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin comonomers. It is noted that although a polymer is often referred to as being "made of" one or more specified monomers, "based on" a specified monomer or monomer type, "containing" a specified monomer content, or the like, in this context the term "monomer" refers to the polymerized remnant of the specified monomer and not to the unpolymerized species. In general, polymers herein are referred to has being based on "units" that are the polymerized form of a corresponding monomer.

A "sheath" is a generic term and when used in relation to cables, it includes insulation coverings or layers, protective jackets and the like.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Examples of ULDPE and VLDPE include ATTANE™ ultra low density polyethylene resins (available form The Dow Chemical Company) and FLEXOMER™ very low density polyethylene resins (available from The Dow Chemical Company).

A "wire" is a single strand of conductive metal, e.g., copper or aluminum, or a single strand of optical fiber.

Test Methods

Density is measured in accordance with ASTM D792, Method B. The result is recorded in grams (g) per cubic centimeter (g/cc or g/cm³).

Melting Point (Tm) is measured by the Differential Scanning calorimetry (DSC) technique for measuring the melting peaks of polyolefins as described in U.S. Pat. No. 5,783,638. The melting point is reported in degrees Celsius (° C.).

Retained Peroxide Percentage

The "Retained Peroxide Percentage" is the amount of organic peroxide present in the composition after exposure to 100° C. for a period of time (0.5 hours, 1.0 hours, 1.5 hours, or 2.0 hours), compared to the amount of organic peroxide present in the same composition after it is conditioned at 100° C. for a period of 2 minutes (i.e., the initial peroxide amount, before significant decomposition of organic peroxide occurs).

A sample solution containing dicumyl peroxide (DCP), dodecylbenzene sulfonic acid (DBSA), a triorganophosphine, and dodecane (to simulate the ethylene-based polymer) is formed in a 6 dram glass vial. The solution is stirred with a magnetic stir bar.

The glass vials are immersed in a well-stirred (500 rpm) bath of silicon oil maintained at a temperature of 100° C. on a stirring hot plate. The sample solution is heated to a temperature of 100° C., and maintained at 100° C., while mixing, for a period of 2.0 minutes, 0.5 hours, 1.0 hours, 1.5 hours, and 2.0 hours. The sample solution is heated in the glass vial without a cap or lid (in other words, the sample solution is exposed to the atmosphere while heating).

Then, the sample solution is analyzed after time periods of 2 minutes, 0.5 hours, 1.0 hours, 1.5 hours, and 2.0 hours at 100° C., to determine the concentration or amount of DCP. A 600 ul aliquot is taken from each glass vial and placed in a 1.5 mL mini centrifuge tube, cooled in an ice bath for 7-10 minutes, and centrifuged in a VWR Galaxy Mini Centrifuge, Model C1413, at an rpm of 6,000. Then, a 350 µl clear fraction is taken from each aliquot and combined with 700 µl of i-propanol and analyzed with liquid chromatography to determine the concentration of DCP present in the fraction. The amount of DCP is reported in units of wt % or mol %, and then converted to Retained Peroxide Percentage. The amount of DCP in the sample solution measured after 2 minutes at 100° C. is referred to as the initial DCP amount.

The Retained Peroxide Percentage is calculated in accordance with the following Equation (1):

$$\text{Retained Peroxide Percentage (\%)} = \left( \frac{\text{wt \% Peroxide at time} = t \text{ hours}}{\text{wt \% Peroxide at time} = 2 \text{ min}} \right) \times 100 \quad \text{Equation (1)}$$

wherein t=0.5 hours, 1.0 hours, 1.5 hours, or 2.0 hours.

Retained Maximum Torque (MH)

Retained Maximum Torque (MH) is an indication of the ultimate degree of crosslinking (an indication of the amount of peroxide that is present). MH is determined as follows. Moving Die Rheometer (MDR) analyses are performed on compounds using Alpha Technologies Rheometer MDR model 2000 unit. The test is based on ASTM procedure D 5289, "Standard Test Method for Rubber—Property Vulcanization Using Rotorless Cure Meters". The MDR analyses are performed using 4-5 grams of material (the compounds in Table 5) at time intervals (t) of t at 0 hours and t at 21 days. Samples are tested at 180° C. or 182° C. for 20 minutes, or at 140° C. for up to 120 minutes, at 0.5 degrees arc oscillation for both temperature conditions. The compounds that are tested contain all necessary additives, including the crosslinking agents (such as an organic peroxide).

The Retained MH Percentage is calculated in accordance with the following Equation (2):

$$\text{Retained } MH \text{ Percentage (\%)} = \left( \frac{MH \text{ at time} = t\,21 \text{ days}}{MH \text{ at time} = t\,0 \text{ hr}} \right) \times 100 \quad \text{Equation (2)}$$

wherein t=21 days at 70° C.

DETAILED DESCRIPTION

The present disclosure provides a composition suitable for wire and cable applications. The composition includes: (i) an ethylene-based polymer; (ii) an organic peroxide, (iii) a triorganophosphine, and (iv) a protic acid-source compound ("PASC") selected from a protic acid, a protic acid-generator compound ("PAGC"), and combinations thereof. The triorganophosphine has the Structure (1):

Structure (1)

wherein $R^1$, $R^2$, and $R^3$ each is independently selected from a $C_1$-$C_{40}$ hydrocarbyl group, a $C_1$-$C_{40}$ heterohydrocarbyl group, and combinations thereof;

with the proviso that the phosphorus atom is bound to a carbon atom in each of $R^1$, $R^2$, and $R^3$.

In an embodiment, the composition includes (i) an ethylene-based polymer; (ii) an organic peroxide, (iii) a triorganophosphine, and (iv) a PASC selected from the group consisting of a protic acid, a PAGC, and combinations thereof; and (v) optionally, an additive.

i. Ethylene-Based Polymer

The present composition includes an ethylene-based polymer.

The ethylene-based polymer may be any ethylene-based polymer disclosed herein.

The ethylene-based polymer may be an ethylene homopolymer or an ethylene interpolymer. Examples of ethylene-based polymer include LDPE and linear polyethylene. Examples of linear polyethylene include LLDPE, ULDPE, VLDPE, multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, MDPE, and HDPE. In an embodiment, the ethylene-based polymer is selected from LDPE, LLDPE, ULDPE, VLDPE, EPE, OBC, m-LLDPE, substantially linear, or linear, plastomers/elastomers, MDPE, HDPE, and combinations thereof.

In an embodiment, the ethylene-based polymer is an ethylene/α-olefin copolymer. In a further embodiment, the ethylene/α-olefin copolymer is an ethylene/$C_3$-$C_{20}$ α-olefin, or an ethylene/$C_3$-$C_{10}$ α-olefin, or an ethylene/$C_4$-$C_{10}$ α-olefin, or an ethylene/$C_4$-$C_8$ α-olefin. Examples of suitable α-olefins include 1-butene, 1-hexene, and 1-octene.

In an embodiment, the ethylene-based polymer is void of, or substantially void of, styrene.

In an embodiment, the ethylene/α-olefin copolymer consists of the ethylene, and a $C_4$-$C_8$ α-olefin comonomer. In other words, the ethylene/$C_4$-$C_8$ α-olefin copolymer contains the ethylene and $C_4$-$C_8$ α-olefin comonomer as the only monomeric units.

The ethylene-based polymer may or may not be functionalized. A "functionalized ethylene-based polymer" includes a functional group. In an embodiment, the functional group is grafted pendant to the polymer chain. The functional group may also be incorporated through copolymerization of a suitable monomer containing the desired functional group. Examples of suitable functional groups include halo, particularly chloro and bromo, hydroxyl, carboxyl, carbonyl, phosphono, acid anhydride, amino, amine, imide, epoxy, mercapto, sulfate, sulfonate, amido, and ester groups. Examples of unsaturated carboxylic acid and acid anhydride compounds that can be grafted onto the preformed ethylene-based polymer include maleic acid, fumaric acid, itaconic acid, acrylic acid, methacrylic acid, crotonic acid, maleic anhydride, and itaconic anhydride. In an embodiment, the functionalized ethylene-based polymer is a maleic-anhydride functionalized ethylene/α-olefin interpolymer. In a further embodiment, the functionalized ethylene-based polymer is a maleic-anhydride functionalized ethylene/octene interpolymer. The ethylene-based polymer may include one or more of ethylene-ethyl acrylate copolymer, ethylene-methyl acrylate copolymer, ethylene-butyl acrylate copolymer, ethylene-vinyl acrylate copolymer, ethylene-acrylic acid copolymer, ethylene-vinyl trimethoxysilane copolymer, or other copolymers made in a high pressure reactor and containing from 0.2 wt % to less than 50 wt %, or 50 wt % comonomer.

In an embodiment, the ethylene-based polymer is not functionalized.

The ethylene-based polymer contains from 50 wt %, or 55 wt %, or 60 wt %, or 65 wt %, or 70 wt %, or 75 wt % to 80 wt %, or 85 wt %, or 90 wt %, or 95 wt %, or 100 wt % ethylene, based on the total weight of the ethylene-based polymer.

In an embodiment, the ethylene-based polymer contains from 55 wt %, or 60 wt %, or 65 wt %, or 70 wt %, or 75 wt % to 80 wt %, or 85 wt %, or 90 wt %, or 95 wt % ethylene; and a reciprocal amount of α-olefin comonomer, or from 5 wt %, or 10 wt %, or 15 wt %, or 20 wt % to 25 wt %, or 30 wt %, or 35 wt %, or 40 wt %, or 45 wt % α-olefin comonomer, based on the total weight of the ethylene-based polymer.

The ethylene-based polymer may comprise two or more embodiments disclosed herein.

ii. Organic Peroxide

The present composition includes an organic peroxide. An "organic peroxide" is a compound containing at least one carbon atom having the following Structure (2):

$$R^1\text{—O—O—}R^2 \qquad \text{Structure (2)}$$

wherein $R^1$ and $R^2$ each is independently selected from a $C_1$-$C_{40}$ hydrocarbyl group, a $C_1$-$C_{40}$ heterohydrocarbyl group, hydrogen, and combinations thereof;

with the proviso that at least one of $R^1$ and $R^2$ is a $C_1$-$C_{40}$ hydrocarbyl group or a $C_1$-$C_{40}$ heterohydrocarbyl group.

Examples of suitable organic peroxides include dicumyl peroxide (DCP), lauryl peroxide, benzoyl peroxide, tertiary butyl perbenzoate, di(tertiary-butyl) peroxide, cumene hydroperoxide, 2,5-dimethyl-2,5-di(t-butyl-peroxy)hexyne-3, 2,-5-di-methyl-2,5-di(t-butyl-peroxy)hexane, tertiary butyl hydroperoxide, isopropyl percarbonate, alpha,alpha'-bis(tertiary-butylperoxy)diisopropylbenzene, t-butylperoxy-2-ethylhexyl-monocarbonate, 1,1-bis(t-butylperoxy)-3,5,5-trimethyl cyclohexane, 2,5-dimethyl-2,5-dihydroxyperoxide, t-butylcumylperoxide, alpha,alpha'-bis(t-butylperoxy)-p-diisopropyl benzene, di-(tert-butylperoxyisopropyl)benzene, tert-butyl cumyl peroxide, di-tert-butyl peroxide, and combinations thereof.

Non-limiting examples of suitable commercially available organic peroxides include TRIGONOX™ from AkzoNobel and LUPEROX™ from ARKEMA.

In an embodiment, the organic peroxide is selected from dicumyl peroxide (DCP); 2,-5-di-methyl-2,5-di(t-butyl-peroxy)hexane; di-(tert-butylperoxyisopropyl)benzene; tert-butyl cumyl peroxide; di-tert-butyl peroxide; and combinations thereof.

In an embodiment, the organic peroxide is dicumyl peroxide (DCP).

In an embodiment, the peroxide is a dialkylperoxide. A "dialkylperoxide" is a compound having the following Structure (2A):

$$R^1\text{—O—O—}R^2 \qquad \text{Structure (2A)}$$

wherein $R^1$ and $R^2$ each is an alkyl group.

In an embodiment, $R^1$ and $R^2$ of Structure (2A) each is a $C_1$-$C_{20}$ alkyl group, or a $C_1$-$C_{10}$ alkyl group.

Organic peroxide excludes organic hydroperoxide, which contains an —OOH group.

Organic peroxide excludes hydrogen peroxide, which has the formula $H_2O_2$, because hydrogen peroxide lacks carbon.

The organic peroxide may comprise two or more embodiments disclosed herein.

iii. Triorganophosphine

The present composition includes a triorganophosphine.

A "triorganophosphine" is a compound having the following Structure (1):

Structure (1)

wherein $R^1$, $R^2$, and $R^3$ each is independently selected from a $C_1$-$C_{40}$ hydrocarbyl group, a $C_1$-$C_{40}$ heterohydrocarbyl group, and combinations thereof;

with the proviso that the phosphorus atom is bound to a carbon atom in each of $R^1$, $R^2$, and $R^3$.

The triorganophosphine includes a phosphorous atom bonded to three carbon atoms.

Triorganophosphine excludes di-phosphines that have a phosphorous atom bonded to only two carbon atoms.

In an embodiment, the hydrocarbyl group of Structure (1) is a $C_1$-$C_{20}$ hydrocarbyl group, or a $C_1$-$C_{10}$ hydrocarbyl group, or a $C_2$-$C_8$ hydrocarbyl group, or a $C_6$-$C_8$ hydrocarbyl group. Examples of suitable $C_1$-$C_{40}$ hydrocarbyl groups include phenyl groups, p-tolyl groups, cyclohexyl groups, n-octyl groups.

In an embodiment, the heterohydrocarbyl group of Structure (1) is a $C_1$-$C_{20}$ heterohydrocarbyl group, or a $C_1$-$C_{10}$ hydro heterohydrocarbyl carbonyl group, or a $C_2$-$C_8$ heterohydrocarbyl group, or a $C_3$-$C_8$ heterohydrocarbyl group. An example of a suitable $C_1$-$C_{40}$ heterohydrocarbyl group is a 2-furyl.

In an embodiment, $R^1$, $R^2$, and $R^3$ of Structure (1) each is independently selected from a $C_6$-$C_8$ hydrocarbyl group, a $C_3$-$C_8$ heterohydrocarbyl group, and combinations thereof.

In an embodiment, $R^1$, $R^2$, and $R^3$ of Structure (1) each is independently selected from a phenyl group, a p-tolyl group, a cyclohexyl group, an n-octyl group, and a 2-furyl group.

In an embodiment, $R^1$, $R^2$, and $R^3$ of Structure (1) each is independently selected from a p-tolyl group, a cyclohexyl group, an n-octyl group, and a 2-furyl group.

In an embodiment, $R^1$, $R^2$, and $R^3$ of Structure (1) each is independently selected from a phenyl group, a p-tolyl group, a cyclohexyl group, and an n-octyl group.

In Structure (1), $R^1$, $R^2$, and $R^3$ may be the same or different. In an embodiment, $R^1$, $R^2$, and $R^3$ are the same. In another embodiment, at least two, or each of $R^1$, $R^2$, and $R^3$ are different.

In an embodiment, $R^1$, $R^2$, and $R^3$ each is a phenyl group. The triorganophosphine is triphenylphosphine.

In an embodiment, $R^1$, $R^2$, and $R^3$ each is a p-tolyl group. The triorganophosphine is tri(p-tolyl)phosphine.

In an embodiment, $R^1$, $R^2$, and $R^3$ each is a cyclohexyl group. The triorganophosphine is tri(cyclohexyl)phosphine.

In an embodiment, $R^1$, $R^2$, and $R^3$ each is an n-octyl group. The triorganophosphine is tri(n-octyl)phosphine.

In an embodiment, $R^1$, $R^2$, and $R^3$ each is a 2-furyl group. The triorganophosphine is tris(2-furyl)phosphine.

In an embodiment, the triorganophosphine is selected from triphenylphosphine, tri(p-tolyl)phosphine, tri(cyclohexyl)phosphine, tri(n-octyl)phosphine, tris(2-furyl)phosphine, and combinations thereof.

In an embodiment, the triorganophosphine is selected from tri(p-tolyl)phosphine, tri(cyclohexyl)phosphine, tri(n-octyl)phosphine, tris(2-furyl)phosphine, and combinations thereof.

The triorganophosphine may comprise two or more embodiments disclosed herein.

iv. Protic Acid-Source Compound

The present composition includes a protic acid-source compound.

A "protic acid source compound" (or "PASC") is a protic acid, or a protic acid-generator compound ("PAGC").

A. Protic Acid

A "protic acid" is a substance that yields hydrogen ions ($H^+$) under polyolefin melt extrusion or other conditions and is capable of causing ionic decomposition of organic peroxides instead of free radical decomposition. Protic acids exclude polyolefin-based radicals. Protic acids can act as proton donors, and can accept a pair of electrons to form a covalent bond. Examples of suitable protic acid include sulfur-based acid, carboxylic acid, phosphorus-based acid, and combinations thereof.

A "sulfur-based acid" is an organic acid containing a sulfur atom. Examples of suitable sulfur-based acids include sulfonic acid, sulfenic acid, sulfinic acid, and combinations thereof.

A "sulfonic acid" is an organic acid containing a group of the following Structure (3):

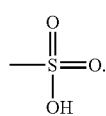

Structure (3)

An example of a suitable sulfonic acid is dodecylbenzene sulfonic acid (DBSA).

A "sulfenic acid" is an organic acid containing a group of the following Structure (4):

—S—O—H    Structure (4).

An example of a suitable sulfenic acid is methanesulfenic acid.

A "sulfinic acid" is an organic acid containing a group of the following Structure (5):

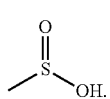

Structure (5)

An example of a suitable sulfinic acid is phenylsulfinic acid.

A "phosphorus-based acid" is an organic acid containing a phosphorous atom. Examples of suitable phosphorous-based acid include phosphorous acid, phosphoric acid, and combinations thereof.

In an embodiment, the protic acid is selected from sulfonic acid, sulfenic acid, sulfinic acid, carboxylic acid, and combinations thereof. In a further embodiment, the protic acid is selected from sulfonic acid, sulfenic acid, sulfinic acid, and combinations thereof.

The protic acid may comprise two or more embodiments disclosed herein.

B. Protic Acid-Generator Compound

A "protic acid-generator compound" (or "PAGC") is a substance that is not a protic acid, but contains a functional group that reacts with oxygen and/or oxidation products (such as hydroperoxides) so as to be converted to or to generate a protic acid during the formation, storage, processing, and/or extrusion of the present composition. The PAGC is a latent protic acid. During the formation (e.g., melt blending), storage, processing, and/or extrusion of the composition, the PAGC undergoes a reaction or a series of reactions that yields a protic acid.

Examples of suitable PAGC include antioxidants (AO), additives, fillers, and combinations thereof. Examples of suitable antioxidants include phosphite antioxidants and sulfur-based antioxidants.

In an embodiment, the PAGC is a phosphite antioxidant. Phosphite antioxidants and their oxidation products (phosphates) undergo hydrolysis in use (as an antioxidant) and/or during processing to yield a phosphorus-based acid. Oxidation may occur before or after hydrolysis. An example of a suitable phosphite antioxidant is tris(2,4-ditert-butlphenyl) phosphite, commercially available as IRGAFOS™ 168 from BASF Inc.

In an embodiment, the PAGC is a sulfur-based antioxidant. Sulfur-based antioxidants oxidize during formation, storage, processing, and/or extrusion of the present composition. The oxidation product undergoes thermal cleavage to form a sulfur-based acid, such as sulfonic acid, sulfenic acid, sulfinic acid, and combinations thereof. The sulfur-based acid may undergo further oxidation to form a sulfur-based acid with a higher oxidation state. Examples of sulfur-based antioxidants include distearyl thiodipropionate (DSTDP); 4,4'-thiobis(2-t-butyl-5-methylphenol) (e.g., LOWINOX™ TBM-6, available from Addivant Corporation); 2,2'-thiobis (6-t-butyl-4-methylphenol) (e.g., LOWINOX™ TBP-6, available from Addivant Corporation); and combinations thereof.

In an embodiment, the PAGC is an ester additive. Esters can hydrolyze during use, processing, and/or storage to form carboxylic acids. Examples of suitable ester additive include pentaerythritol tetrakis(3-(3,5-di-tert-butyl-4-hydroxyphenyl)propionate (e.g., IRGANOX™ 1010, available from BASF); octadecyl-3-(3,5-di-tert-butyl-4-hydroxyphenyl)-propionate (e.g., IRGANOX™ 1076, available from Ciba Inc.); and combinations thereof.

In an embodiment, the PAGC is selected from a sulfur-based antioxidant, a phosphite antioxidant, an ester additive, and combinations thereof.

In an embodiment, the PAGC is selected from a sulfur-based antioxidant, a phosphite antioxidant, and combinations thereof.

The PAGC may comprise two or more embodiments disclosed herein.

The present composition may include a PAGC (such as a sulfur-based antioxidant) when the composition is formed, and will then include a protic acid once the PAGC undergoes a reaction (such as oxidation) that yields a protic acid (such as sulfonic acid, sulfenic acid, and/or sulfinic acid). At a single point in time, the composition may include (i) only the PAGC (and not the protic acid), (ii) a combination of both the PAGC and the protic acid, or (iii) only the protic acid (and not the PAGC).

The PASC, and further the PAGC, is different than the ethylene-based polymer. In other words, the PASC, and further the PAGC, excludes ethylene-based polymer and any oxidation reaction products from the ethylene-based polymer.

The PASC may comprise two or more embodiments disclosed herein.

v. Optional Additive

The present composition may include one or more additives. Examples of suitable additives include antioxidants, colorants, corrosion inhibitors, lubricants, ultra violet (UV) absorbers or stabilizers, anti-blocking agents, coupling agents, compatibilizers, plasticizers, fillers, processing aids, moisture scavengers, scorch retardants, metal deactivators, and combinations thereof.

The additive may comprise two or more embodiments disclosed herein.

vi. Composition

The present composition includes: (i) the ethylene-based polymer; (ii) the organic peroxide; (iii) the triorganophosphine; (iv) the PASC selected from a protic acid, a PAGC, and combinations thereof; and (v) optionally, an additive. The triorganophosphine has the Structure (1):

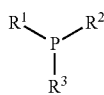

Structure (1)

wherein $R^1$, $R^2$, and $R^3$ each is independently selected from a $C_1$-$C_{40}$ hydrocarbyl group, a $C_1$-$C_{40}$ heterohydrocarbyl group, and combinations thereof;

with the proviso that the phosphorus atom is bound to a carbon atom in each of $R^1$, $R^2$, and $R^3$.

In an embodiment, the composition includes from 45 wt %, or 50 wt %, or 55 wt %, or 60 wt %, or 65 wt %, or 70 wt % to 75 wt %, or 80 wt %, or 85 wt %, or 90 wt %, or 95 wt %, or 97 wt %, or 99 wt %, or 99.96 wt % ethylene-based polymer, based on the total weight of the composition.

In an embodiment, the composition includes from 0.02 wt %, or 0.05 wt %, or 0.1 wt %, or 0.5 wt %, or 1 wt % to 2 wt %, or 3 wt %, or 4 wt %, or 5 wt % organic peroxide, based on the total weight of the composition.

In an embodiment, the composition includes from 0.001 wt %, or 0.003 wt %, or 0.005 wt %, or 0.007 wt %, or 0.01 wt %, or 0.02 wt %, or 0.05 wt % to 0.10 wt %, or 0.20 wt %, or 0.30 wt %, or 0.40 wt %, or 0.50 wt %, or 0.60 wt %, or 0.70 wt %, or 0.80 wt %, or 0.90 wt %, or 1.00 wt % triorganophosphine, based on the total weight of the composition. In an embodiment, the composition incudes from 0.001 wt % to 1.00 wt %, or from 0.01 wt % to 0.50 wt %, or from 0.01 wt % to 0.10 wt %, or from greater than 0.001 wt % to 1.00 wt %, or from greater than 0.01 wt % to 0.50 wt %, or from greater than 0.01 wt % to 0.10 wt %, or from 0.05 wt % to 0.50 wt %, or from 0.05 wt % to 0.10 wt % triorganophosphine, based on the total weight of the composition.

In an embodiment, the composition includes from 0.001 mol %, or 0.002 mol %, or 0.004 mol %, or 0.01 mol %, or 0.1 mol % to 0.4 mol %, or 0.5 mol %, or 1.0 mol %, or 2.0 mol %, or 5.0 mol %, or 10 mol %, or 15 mol %, or 20 mol %, or 25 mol % triorganophosphine, based on the total composition.

In an embodiment, the composition includes from 0.0001 wt %, or 0.001 wt %, or 0.01 wt %, or 0.05 wt %, or 0.1 wt %, or 0.5 wt %, or 1.0 wt %, or 5 wt %, or 10 wt %, or 15 wt % to 20 wt %, or 25 wt %, or 30 wt %, or 35 wt %, or 40 wt %, or 45 wt %, or 50 wt % PASC, based on the total weight of the composition.

In an embodiment, the composition includes from 0 wt %, or greater than 0 wt %, or 0.001 wt %, or 0.002 wt %, or 0.005 wt %, or 0.006 wt % to 0.007 wt %, or 0.008 wt %, or 0.009 wt %, or 0.01 wt %, or 0.1 wt %, or 0.2 wt %, or 0.3 wt %, or 0.4 wt %, or 0.5 wt %, or 1.0 wt %, or 2.0 wt %, or 2.5 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition.

In an embodiment, the composition has a Retained Peroxide Percentage from 2%, or 5%, or 8%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 2 hours. In a further embodiment the composition has a Retained Peroxide Percentage from 2% to 100%, or from 5% to 100%, or from 10% to 100%, or from 15% to 100%, or from 20% to 100%, or from 50% to 100%, or from 70% to 100%, or from 80% to 100%, or from 90% to 100%, or from 95% to 100%, or from 98% to 100% after heating at 100° C. for 2 hours. Not wishing to be bound by any particular theory, it is believed that the inclusion of the triorganophosphine in the present composition prevents, or slows, the ionic decomposition of the organic peroxide conventionally caused by the presence of protic acid in the composition. By stopping, or slowing the ionic decomposition of the organic peroxide during the formation, storage, processing, and/or extrusion of the present composition, the triorganophosphine advantageously enables the retention of the organic peroxide such that the organic peroxide is present and available for free-radical crosslinking after extrusion of the present composition onto a conductor. Without sufficient retention of the organic peroxide during the formation, storage, processing, and/or extrusion of the present composition, a coating formed from the present composition would not crosslink after being extruded onto a conductor.

In an embodiment, the composition has a Retained Peroxide Percentage from 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.5 hours.

In an embodiment, the composition has a Retained Peroxide Percentage from 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.0 hours.

In an embodiment, the composition has a Retained Peroxide Percentage from 51%, or 53%, or 55%, or 60%, or 65%, or 70%, or 75%, or 80%, or 85%, or 90%, or 95%, or 97%, or 98% to 100% after heating at 100° C. for 0.5 hours.

In an embodiment, the composition contains: (i) from 45 wt %, or 50 wt %, or 55 wt %, or 60 wt %, or 65 wt %, or 70 wt % to 75 wt %, or 80 wt %, or 85 wt %, or 90 wt %, or 95 wt %, or 97 wt %, or 99 wt %, or 99.96 wt % ethylene-based polymer; (ii) from 0.02 wt %, or 0.05 wt %, or 0.1 wt %, or 0.5 wt %, or 1 wt % to 2 wt %, or 3 wt %, or 4 wt %, or 5 wt % organic peroxide; (iii) from 0.001 wt %, or 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt % triorganophosphine; (iv) from 0.0001 wt %, or 0.001 wt %, or 0.01 wt %, or 0.05 wt %, or 0.1 wt %, or 0.5 wt %, or 1.0 wt %, or 5 wt %, or 10 wt %, or 15 wt % to 20 wt %, or 25 wt %, or 30 wt %, or 35 wt %, or 40 wt %, or 45 wt %, or 50 wt % PASC; (v) from 0 wt %, or greater than 0 wt %, or 0.001 wt %, 0.005 wt %, or 0.01 wt %, or 0.1 wt %, or 0.5 wt %, or 1.0 wt %, or 2.0 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition; and the composition has one, some, or all, of the following properties: (a) a Retained Peroxide Percentage from 2%, or 5%, or 8%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 2 hours; and/or (b) a Retained Peroxide Percentage from 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.5 hours; and/or (c) a Retained Peroxide Percentage from 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.0 hours; and/or (d) a Retained Peroxide Percentage from 51%, or 53%, or 55%, or 60%, or 65%, or 70%, or 75%, or 80%, or 85%, or 90%, or 95%, or 97%, or 98% to 100% after heating at 100° C. for 0.5 hours.

In an embodiment, the composition contains: (i) from 45 wt %, or 50 wt %, or 55 wt %, or 60 wt %, or 65 wt %, or 70 wt % to 75 wt %, or 80 wt %, or 85 wt %, or 90 wt %, or 95 wt %, or 97 wt %, or 99 wt %, or 99.96 wt % ethylene-based polymer; (ii) from 0.02 wt %, or 0.05 wt %, or 0.1 wt %, or 0.5 wt %, or 1 wt % to 2 wt %, or 3 wt %, or 4 wt %, or 5 wt % organic peroxide; (iii) from 0.001 wt %, or 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt % triorganophosphine; (iv) from 0.0001 wt %, or 0.001 wt %, or 0.01 wt %, or 0.05 wt %, or 0.1 wt %, or 0.5 wt %, or 1.0 wt %, or 5 wt %, or 10 wt %, or 15 wt % to 20 wt %, or 25 wt %, or 30 wt %, or 35 wt %, or 40 wt %, or 45 wt %, or 50 wt % PASC selected from a sulfonic acid, a sulfenic acid, a sulfinic acid, a sulfur-based antioxidant, and combinations thereof; (v) from 0 wt %, or greater than 0 wt %, or 0.001 wt %, 0.005 wt %, or 0.01 wt %, or 0.1 wt %, or 0.5 wt %, or 1.0 wt %, or 2.0 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition; and the composition has one, some, or all, of the following properties: (a) a Retained Peroxide Percentage from 2%, or 5%, or 8%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 2 hours; and/or (b) a Retained Peroxide Percentage from 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.5 hours; and/or (c) a Retained Peroxide Percentage from 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.0 hours; and/or (d) a Retained Peroxide Percentage from 51%, or 53%, or 55%, or 60%, or 65%, or 70%, or 75%, or 80%, or 85%, or 90%, or 95%, or 97%, or 98% to 100% after heating at 100° C. for 0.5 hours.

In an embodiment, the composition contains from greater than 0.001 wt %, or 0.003 wt %, or 0.005 wt %, or 0.007 wt %, 0.009 wt %, or 0.01 wt %, 0.04 wt %, or 0.05 wt %, or 0.09 wt %, or 0.10 wt % to 0.50 wt %, or 1.0 wt % triorganophosphine, based on the total weight of the composition, and $R^1$, $R^2$, and $R^3$ of Structure (1) each is a phenyl group. In another embodiment, the composition contains from greater than 0.001 wt % to 1.0 wt %, or from greater than 0.005 wt % to 1.0 wt %, or from greater than 0.01 wt % to 1.0 wt %, or from greater than 0.05 wt % to 1.0 wt % triorganophosphine, based on the total weight of the composition, and $R^1$, $R^2$, and $R^3$ of Structure (1) each is a phenyl group. In an embodiment, the composition has a Retained Peroxide Percentage from 70%, or 80%, or 90%, or 95%, or 97%, or 98%, or 98.2% to 100% after heating at 100° C. for 2 hours.

In an embodiment, the composition contains from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is a p-tolyl group. In an embodiment, the composition has a Retained Peroxide Percentage from 20%, or 25%, or 30%, or 50%, or 60%, or 70%, or 80%, or 85%, or 90%, or 91% to 100% after heating at 100° C. for 2 hours.

In an embodiment, the composition contains from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is a cyclohexyl group. In an embodiment, the composition has a Retained Peroxide Percentage from 10%, or 15%, or 20%, or 50%, or 60%, or 70%, or 80%, or 90%, or 95%, or 97% to 100% after heating at 100° C. for 2 hours.

In an embodiment, the composition contains from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is an n-octyl group. In an embodiment, the composition has a Retained Peroxide Percentage from 15%, or 20%, or 24%, or 30%, or 50%, or 60%, or 70%, or 80%, or 90%, or 95%, 98% to 100% after heating at 100° C. for 2 hours.

In an embodiment, the composition contains from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is a 2-furyl group. In an embodiment, the composition has a Retained Peroxide Percentage from 2%, or 5%, or 6%, or 7%, or 8%, or 10%, or 30%, or 50%, or 55%, or 59%, or 60%, or 62% to 100% after heating at 100° C. for 2 hours.

In an embodiment, the composition contains:
(i) from 45 wt %, or 50 wt %, or 55 wt %, or 60 wt %, or 65 wt %, or 70 wt % to 75 wt %, or 80 wt %, or 85 wt %, or 90 wt %, or 95 wt %, or 97 wt %, or 98 wt %, or 99 wt % ethylene-based polymer;
(ii) from 0.02 wt %, or 0.05 wt %, or 0.1 wt %, or 0.5 wt %, or 1 wt % to 2 wt %, or 3 wt %, or 4 wt %, or 5 wt % organic peroxide;
(iii) from 0.001 wt %, or 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt % triorganophosphine;
(iv) from 0.0001 wt %, or 0.001 wt %, or 0.01 wt %, or 0.05 wt %, or 0.1 wt %, or 0.5 wt %, or 1.0 wt %, or 5 wt %, or 10 wt %, or 15 wt % to 20 wt %, or 25 wt %, or 30 wt %, or 35 wt %, or 40 wt %, or 45 wt %, or 50 wt % PASC that is a PAGC;
(v) from 0 wt %, or greater than 0 wt %, or 0.001 wt %, 0.005 wt %, or 0.01 wt %, or 0.1 wt %, or 0.5 wt %, or 1.0 wt %, or 2.0 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition wherein the aggregate of components (i)-(v) amount to 100 wt %; and the composition has:
(a) a Retained MH from 80%, or 85%, or 90%, or 95%, or 97%, or 98% to 100% after heating at 70° C. for 21 days.

In an embodiment, the composition contains:
(i) from 95 wt %, or 96 wt %, or 97 wt %, to 98 wt %, or 99 wt % ethylene-based polymer;
(ii) from 0.05 wt %, or 0.1 wt %, or 0.5 wt %, or 1 wt % to 2 wt %, or 3 wt % or 4 wt %, or 5 wt %, organic peroxide;
(iii) from 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, triorganophosphine;
(iv) from 0.1 wt %, or 0.2 wt %, or 0.25 wt % to 0.3 wt %, or 0.4 wt %, or 0.5 wt % PAGC;
(v) from 0 wt %, or greater than 0 wt %, or 0.001 wt %, 0.005 wt %, or 0.01 wt %, or 0.1 wt %, or 0.5 wt %, or 1.0 wt %, additive, based on the total weight of the composition wherein the aggregate of components (i)-(v) amount to 100 wt %; and the composition has:
(a) a Retained MH from 95%, or 97%, to 98%, or 99%, or 100% after heating at 70° C. for 21 days (hereafter referred to Composition1).

In an embodiment, Compositon1 has all the aforementioned properties set forth in the preceding paragraph and the PAGC of Composition1 is a sulfur-based antioxidant. In an further embodiment, the sulfur-base antioxidant for Composition1 is distearyl thiodipropionate (DSTDP).

Not wishing to be bound by any particular theory, it is believed that the inclusion of the triorganophosphine in the present composition prevents, or slows, the ionic decomposition of the organic peroxide conventionally caused by the presence of the PASC (and the presence of PAGC in particular) in the composition. By stopping, or slowing the ionic decomposition of the organic peroxide during the formation, storage, processing, and/or extrusion of the present composition, the triorganophosphine advantageously enables the retention of the organic peroxide such that the organic peroxide is present and available for free-radical crosslinking after extrusion of the present composition onto a conductor. Without sufficient retention of the organic peroxide during the formation, storage, processing, and/or extrusion of the present composition, a coating formed from the present composition would not crosslink after being extruded onto a conductor.

The sum of the components in each of the compositions disclosed herein, including the foregoing compositions, yields 100 weight percent (wt %).

The composition may be formed by melt blending (such as by extrusion) all, or some, of the components. In an embodiment, the ethylene-based polymer, the triorganophosphine, the PASC, and the optional additive are extruded and pelletized. Then, the organic peroxide is imbibed in the pellets in a soaking step. The pellets containing all of the components may be stored in bags, barrels, boxes, or railcars for a period of time. The pellets may be added to an extruder and extruded onto a surface of a conductor.

In an alternate embodiment, all of the components of the composition are combined in an extruder, and the composition is extruded onto a surface of a conductor.

The composition may comprise two or more embodiments disclosed herein.

In an embodiment, the composition is crosslinked.

The composition may comprise two or more embodiments disclosed herein.

The present disclosure also provides a crosslinked product made by heating the composition to a temperature sufficient to crosslink the composition. The crosslinked product may be a coating on a conductor.

vii. Coated Conductor

The present disclosure also provides a coated conductor. The coated conductor includes a conductor and a coating on the conductor, the coating including a composition. The composition includes: (i) the ethylene-based polymer; (ii) the organic peroxide; (iii) the triorganophosphine; (iv) the PASC selected from a protic acid, a PAGC, and combinations thereof; and (v) optionally, an additive. The triorganophosphine has the Structure (1):

Structure (1)

wherein $R^1$, $R^2$, and $R^3$ each is independently selected from a $C_1$-$C_{40}$ hydrocarbyl group, a $C_1$-$C_{40}$ heterohydrocarbyl group, and combinations thereof;
with the proviso that the phosphorus atom is bound to a carbon atom in each of $R^1$, $R^2$, and $R^3$.

The composition, ethylene-based polymer, organic peroxide, triorganophosphine, PASC, and optional additive may be any respective ethylene-based polymer, organic peroxide, triorganophosphine, PASC, and optional additive disclosed herein.

In an embodiment, the coating includes a composition having a Retained Peroxide Percentage from 2%, or 5%, or 8%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 2 hours. In a further embodiment the composition has a Retained Peroxide Percentage from 2% to 100%, or from 20% to 100%, or from 50% to 100%, or from 70% to 100%, or from 80% to 100%, or from 90% to 100% after heating at 100° C. for 2 hours.

In an embodiment, the coating includes a composition having a Retained Peroxide Percentage from 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.5 hours.

In an embodiment, the coating includes a composition having a Retained Peroxide Percentage from 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.0 hours.

In an embodiment, the coating includes a composition having a Retained Peroxide Percentage from 51%, or 53%, or 55%, or 60%, or 65%, or 70%, or 75%, or 80%, or 85%, or 90%, or 95%, or 97%, or 98% to 100% after heating at 100° C. for 0.5 hours.

In an embodiment, the coating is an insulation sheath for a conductor. In another embodiment, the coating is a jacket for a conductor.

The process for producing a coated conductor includes heating the present composition to at least the melting temperature of the ethylene-based polymer, and then extruding the polymeric melt blend onto the conductor. The term "onto" includes direct contact or indirect contact between the polymeric melt blend and the conductor. The polymeric melt blend is in an extrudable state.

The coating is located on the conductor. The coating may be one or more inner layers such as an insulating layer. The coating may wholly or partially cover or otherwise surround or encase the conductor. The coating may be the sole component surrounding the conductor. When the coating is the sole component surrounding the conductor, the coating may serve as a jacket and/or an insulation. In an embodiment, the coating is the outermost layer on the coated conductor. Alternatively, the coating may be one layer of a multilayer jacket or sheath encasing the metal conductor. In an embodiment, the coating directly contacts the conductor. In another embodiment, the coating directly contacts an insulation layer surrounding the conductor.

In an embodiment, the coating directly contacts the conductor. The term "directly contacts," as used herein, is a coating configuration whereby the coating is located immediately adjacent to the conductor, the coating touches the conductor, and no intervening layers, no intervening coatings, and/or no intervening structures, are present between the coating and the conductor.

In another embodiment, the coating indirectly contacts the conductor. The term "indirectly contacts," as used herein, is a coating configuration whereby an intervening layer, an intervening coating, or an intervening structure, is present between the coating and the conductor. Examples of suitable intervening layers, intervening coatings, and intervening structures include insulation layers, moisture barrier layers, buffer tubes, and combinations thereof. Examples of suitable insulation layers include foamed insulation layers, thermoplastic insulation layers, crosslinked insulation layers, and combinations thereof.

In an embodiment, the coating is an insulation layer of a high voltage power transmission cable or an extra high voltage power transmission cable.

The coating is crosslinked. In an embodiment, crosslinking of the present composition begins in the extruder, but only to a minimal extent. In another embodiment, crosslinking is delayed until the composition is extruded upon the conductor. Crosslinking of the present composition can be initiated and/or accelerated through the application of heat or radiation. In an embodiment, after extrusion, the coated conductor is conditioned at a temperature from 160° C., or 180° C. to 200° C., or 400° C. in a continuous vulcanization tube.

In an embodiment, the coated conductor incudes, consists essentially of, or consists of a conductor and a coating on the conductor. The coating incudes, consists essentially of, or consists of a composition. The composition incudes, consists essentially of, or consists of: (i) from 45 wt %, or 50 wt %, or 55 wt %, or 60 wt %, or 65 wt %, or 70 wt % to 75 wt %, or 80 wt %, or 85 wt %, or 90 wt %, or 95 wt %, or 97 wt %, or 99 wt %, or 99.96 wt % ethylene-based polymer; (ii) from 0.02 wt %, or 0.05 wt %, or 0.1 wt %, or 0.5 wt %, or 1 wt % to 2 wt %, or 3 wt %, or 4 wt %, or 5 wt % organic peroxide; (iii) from 0.001 wt %, or 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt % triorganophosphine; (iv) from 0.0001 wt %, or 0.001 wt %, or 0.01 wt %, or 0.05 wt %, or 0.1 wt %, or 0.5 wt %, or 1.0 wt %, or 5 wt %, or 10 wt %, or 15 wt % to 20 wt %, or 25 wt %, or 30 wt %, or 35 wt %, or 40 wt %, or 45 wt %, or 50 wt % PASC; (v) from 0 wt %, or greater than 0 wt %, or 0.001 wt %, 0.005 wt %, or 0.01 wt %, or 0.1 wt %, or 0.5 wt %, or 1.0 wt %, or 2.0 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition; and the composition has one, some, or all, of the following properties: (a) a Retained Peroxide Percentage from 2%, or 5%, or 8%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 2 hours; and/or (b) a Retained Peroxide Percentage from 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.5 hours; and/or (c) a Retained Peroxide Percentage from 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.0 hours; and/or (d) a Retained Peroxide Percentage from 51%, or 53%, or 55%, or 60%, or 65%, or 70%, or 75%, or 80%, or 85%, or 90%, or 95%, or 97%, or 98% to 100% after heating at 100° C. for 0.5 hours.

In an embodiment, the coated conductor incudes, consists essentially of, or consists of a conductor and a coating on the conductor. The coating incudes, consists essentially of, or consists of a composition. The composition incudes, consists essentially of, or consists of: (i) from 45 wt %, or 50 wt %, or 55 wt %, or 60 wt %, or 65 wt %, or 70 wt % to 75 wt %, or 80 wt %, or 85 wt %, or 90 wt %, or 95 wt %, or 97 wt %, or 99 wt %, or 99.96 wt % ethylene-based polymer; (ii) from 0.02 wt %, or 0.05 wt %, or 0.1 wt %, or 0.5 wt %, or 1 wt % to 2 wt %, or 3 wt %, or 4 wt %, or 5 wt % organic peroxide; (iii) from 0.001 wt %, or 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt % triorganophosphine; (iv) from 0.0001 wt %, or 0.001 wt %, or 0.01 wt %, or 0.05 wt %, or 0.1 wt %, or 0.5 wt %, or 1.0 wt %, or 5 wt %, or 10 wt %, or 15 wt % to 20 wt %, or 25 wt %, or 30 wt %, or 35 wt %, or 40 wt %, or 45 wt %, or 50 wt % selected from a sulfonic acid, a sulfenic acid, a sulfinic acid, a sulfur-based antioxidant, and combinations thereof; (v) from 0 wt %, or greater than 0 wt %, or 0.001 wt %, 0.005 wt %, or 0.01 wt %, or 0.1 wt %, or 0.5 wt %, or 1.0 wt %, or 2.0 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition; and the composition has one, some, or all, of the following properties: (a) a Retained Peroxide Percentage from 2%, or 5%, or 8%, or 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 2 hours; and/or (b) a Retained Peroxide Percentage from 10%, or 15%, or 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.5 hours; and/or (c) a Retained Peroxide Percentage from 20%, or 25%, or 30%, or 35%, or 40%, or 45%, or 50%, or 55%, or 60%, or 65%, or 70%, or 75%, or 80%, or 85%, or 90%, or 95%, or 97%, or 98% to 100% after heating at 100° C. for 1.0 hours; and/or (d) a Retained Peroxide Percentage from 51%, or 53%, or 55%, or 60%, or 65%, or 70%, or 75%, or 80%, or 85%, or 90%, or 95%, or 97%, or 98% to 100% after heating at 100° C. for 0.5 hours.

In an embodiment, the coating includes a composition containing from greater than 0.001 wt %, or 0.003 wt %, or 0.005 wt %, or 0.007 wt %, or 0.009 wt %, or 0.01 wt %, or 0.04 wt %, or 0.05 wt %, or 0.09 wt %, or 0.10 wt % to 0.50 wt %, or 1.0 wt % triorganophosphine, based on the total weight of the composition, and $R^1$, $R^2$, and $R^3$ of Structure (1) each is a phenyl group. In another embodiment, the coating includes a composition containing from greater than 0.001 wt % to 1.0 wt %, or from greater than 0.005 wt % to 1.0 wt %, or from greater than 0.01 wt % to 1.0 wt %, or from greater than 0.05 wt % to 1.0 wt % triorganophosphine, based on the total weight of the composition, and $R^1$, $R^2$, and $R^3$ of Structure (1) each is a phenyl group. In an embodiment, the composition has a Retained Peroxide Percentage from 70%, or 80%, or 90%, or 95%, or 97%, or 98%, or 98.2% to 100% after heating at 100° C. for 2 hours.

In an embodiment, the coating includes a composition containing from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is a p-tolyl group. In an embodiment, the composition has a Retained Peroxide Percentage from 20%, or 25%, or 30%, or 50%, or 60%, or 70%, or 80%, or 85%, or 90%, or 91% to 100% after heating at 100° C. for 2 hours.

In an embodiment, the coating includes a composition containing from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is a cyclohexyl group. In an embodiment, the composition has a Retained Peroxide Percentage from 10%, or 15%, or 20%, or 50%, or 60%, or 70%, or 80%, or 90%, or 95%, or 97% to 100% after heating at 100° C. for 2 hours.

In an embodiment, the coating includes a composition containing from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is an n-octyl group. In an embodiment, the composition has a Retained Peroxide Percentage from 15%, or 20%, or 24%, or 30%, or 50%, or 60%, or 70%, or 80%, or 90%, or 95%, 98% to 100% after heating at 100° C. for 2 hours.

In an embodiment, the coating includes a composition containing from 0.001 wt %, or 0.003 wt %, or 0.005 wt %, or 0.007 wt %, or 0.01 wt %, or 0.05 wt % to 1.0 wt % triorganophosphine, based on the total weight of the composition, and $R^1$, $R^2$, and $R^3$ each is a 2-furyl group. In an embodiment, the composition has a Retained Peroxide Percentage from 2%, or 5%, or 6%, or 7%, or 8%, or 10%, or 30%, or 50%, or 55%, or 59%, or 60%, or 62% to 100% after heating at 100° C. for 2 hours.

In an embodiment, the coated conductor includes a conductor and a coating on the conductor. The coating includes a composition containing:
(i) from 45 wt %, or 50 wt %, or 55 wt %, or 60 wt %, or 65 wt %, or 70 wt % to 75 wt %, or 80 wt %, or 85 wt %, or 90 wt %, or 95 wt %, or 97 wt %, or 98 wt %, or 99 wt % ethylene-based polymer;
(ii) from 0.02 wt %, or 0.05 wt %, or 0.1 wt %, or 0.5 wt %, or 1 wt % to 2 wt %, or 3 wt %, or 4 wt %, or 5 wt % organic peroxide;
(iii) from 0.001 wt %, or 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, or 0.8 wt %, or 0.9 wt %, or 1.0 wt % triorganophosphine;
(iv) from 0.0001 wt %, or 0.001 wt %, or 0.01 wt %, or 0.05 wt %, or 0.1 wt %, or 0.5 wt %, or 1.0 wt %, or 5 wt %, or 10 wt %, or 15 wt % to 20 wt %, or 25 wt %, or 30 wt %, or 35 wt %, or 40 wt %, or 45 wt %, or 50 wt % PASC that is a PAGC;
(v) from 0 wt %, or greater than 0 wt %, or 0.001 wt %, 0.005 wt %, or 0.01 wt %, or 0.1 wt %, or 0.5 wt %, or 1.0 wt %, or 2.0 wt %, or 3.0 wt %, or 4.0 wt %, or 5.0 wt % to 6.0 wt %, or 7.0 wt %, or 8.0 wt %, or 9.0 wt %, or 10.0 wt %, or 15.0 wt %, or 20.0 wt % additive, based on the total weight of the composition wherein the aggregate of components (i)-(v) amount to 100 wt %; and the composition has:
(a) a Retained MH from 80%, or 85%, or 90%, or 95%, or 97%, or 98% to 100% after heating at 70° C. for 21 days.

In an embodiment, the coating on the conductor includes a composition containing:
(i) from 95 wt %, or 96 wt %, or 97 wt %, to 98 wt %, or 99 wt % ethylene-based polymer;
(ii) from 0.05 wt %, or 0.1 wt %, or 0.5 wt %, or 1 wt % to 2 wt %, or 3 wt % or 4 wt %, or 5 wt %, organic peroxide;
(iii) from 0.003 wt %, or 0.005 wt %, or 0.007 wt %, or 0.01 wt %, or 0.05 wt %, or 0.1 wt %, or 0.2 wt %, or 0.3 wt %, or 0.4 wt %, or 0.5 wt % to 0.6 wt %, or 0.7 wt %, triorganophosphine;
(iv) from 0.1 wt %, or 0.2 wt %, or 0.25 wt % to 0.3 wt %, or 0.4 wt %, or 0.5 wt % PAGC;
(v) from 0 wt %, or greater than 0 wt %, or 0.001 wt %, 0.005 wt %, or 0.01 wt %, or 0.1 wt %, or 0.5 wt %, or 1.0 wt %, additive, based on the total weight of the composition wherein the aggregate of components (i)-(v) amount to 100 wt %; and the composition has:
(a) a Retained MH from 95%, or 97%, to 98%, or 99%, or 100% after heating at 70° C. for 21 days (hereafter referred to Composition1).

In an embodiment, Compositon1 has all the aforementioned properties set forth in the preceding paragraph and the PAGC of Composition1 is a sulfur-based antioxidant. In an further embodiment, the sulfur-base antioxidant for Composition1 is distearyl thiodipropionate (DSTDP).

In an embodiment, the coated conductor is selected from a fiber optic cable, a communications cable (such as a telephone cable or a local area network (LAN) cable), a power cable, wiring for consumer electronics, a power cable, a power charger wire for cell phones and/or computers, computer data cords, power cords, appliance wiring material, home interior wiring material, consumer electronic accessory cords, and any combination thereof.

In another embodiment, the present composition is melt-shaped into an article other than a coating on a conductor, e.g., an electrical connector or a component of an electrical connector.

The coated conductor may comprise two or more embodiments disclosed herein.

By way of example, and not limitation, some embodiments of the present disclosure will now be described in detail in the following Examples.

Examples

The materials used in the examples are provided in Table 1 below.

TABLE 1

| Materials | | |
|---|---|---|
| Component | Specification | Source |
| triphenylphosphine | | Sigma-Aldrich |
| tri(cyclohexyl)phosphine | | Sigma-Aldrich |
| tri(n-octyl)phosphine | | TCI America |
| tri(p-tolyl)phosphine | | Arcos Organics |

TABLE 1-continued

Materials

| Component | Specification | Source |
|---|---|---|
| tris(2-furyl)phosphine | | Sigma-Aldrich |
| dicumyl peroxide (DCP) | organic peroxide CAS Number 80-43-3 | Sigma-Aldrich |
| dodecylbenzene sulfonic acid (DBSA) | protic acid CAS Number 121-65-3 | Sigma-Aldrich |

The following three types of Stock Solutions are prepared and used for making Sample Solutions: (i) a solution of dicumyl peroxide (DCP) in dodecane at 0.1154 M (Stock Solution A); (ii) a solution of dodecylbenzene sulfonic acid (DBSA) in dodecane at 0.00346 M (Stock Solution B); and (iii) a solution containing 0.1 wt % of a triorganophosphine in 0.1154 M DCP solution in dodecane (Stock Solution C). Stock Solution C is stirred in an oil bath set at 80° C. (for 1-2 minutes) to ensure complete dissolution of the triorganophosphine.

The Sample Solutions and Comparative Solutions are formed in 6 dram glass vials. Dodecane simulates the properties of (that is, serves as a model for) the ethylene-based polymer. The solutions are stirred with a magnetic stir bar. The composition of each solution is provided in Table 2 below.

Comparative Solution 1 (CS 1) is prepared by adding 2 mL of Stock Solution A, and 2 mL of Stock Solution B to a glass vial and mixing with a magnetic stir bar at room temperature. The total volume of CS 1 is 4 mL. CS 1 contains 0.0577 M DCP (equivalent to 2 wt % DCP) and 0.00173 M DBSA. CS 1 contains no triorganophosphine. The composition of CS 1 is provided in Table 2 below.

Comparative Solution 2 (CS 2) is prepared by adding 2 mL of Stock Solution A and 2 mL dodecane to a glass vial and mixing with a magnetic stir bar at room temperature. The total volume of CS 2 is 4 mL. CS 2 contains 0.0577 M DCP (equivalent to 2 wt % DCP). CS 2 contains no triorganophosphine and no DBSA. The composition of CS 2 is provided in Table 2 below.

Sample Solutions 1-5, 9-10, 12-13, 15-16 and 18-19 each is prepared by adding 2 mL of Stock Solution B, X mL of Stock Solution C, and (2-X) mL of Stock Solution A to a glass vial and mixing with a magnetic stir bar at room temperature, wherein X is equal to 10 multiplied by the weight percent concentration of triorganophosphine. For example, to prepare a Sample Solution containing 0.05 wt % triorganophosphine, 2 mL of Stock Solution B is mixed with 1.5 mL of Stock Solution A and 0.5 mL of Stock Solution C. The composition of Sample Solutions 1-5, 9-10, 12-13, 15-16 and 18-19 is provided in Table 2 below.

Sample Solutions 6-8, 11, 14, 17, and 20 each is prepared by adding 2 mL of Stock Solution A and 2 mL of Stock Solution B to a glass vial and mixing with a magnetic stir bar at room temperature. Triorganophosphine is added to the contents of the glass vial. The composition of Sample Solutions 6-8, 11, 14, 17, and 20 is provided in Table 2 below.

Then, the glass vials are immersed in a well-stirred (500 rpm) bath of silicon oil maintained at a temperature of 100° C. on a Corning™ PC-420D stirring hot plate. The Comparative Solutions and Sample Solutions each is heated to a temperature of 100° C., and maintained at 100° C., while mixing, and 600 µl aliquots are taken after a period of 2 minutes (at which point there is complete dissolution of the triorganophosphine in the solution), 0.5 hours, 1.0 hours, 1.5 hours, and 2.0 hours. The Comparative Solutions and Sample Solutions each is heated in the glass vial without a cap or lid (in other words, each solution is exposed to the atmosphere while heating).

Each 600 µl aliquot taken from a glass vial is placed in a 1.5 mL mini centrifuge tube, cooled in an ice bath for 7-10 minutes, and centrifuged in a VWR Galaxy Mini Centrifuge, Model C1413, at an rpm of 6,000. Then, a 350 µl clear fraction is taken from each aliquot and combined with 700 µl of i-propanol and analyzed with liquid chromatography to determine the concentration of DCP present in the fraction (Shimadzu LC-20AD Liquid Chromatograph with SPD-20A UV Visible detector set at 210 nm; the column is a Waters SunFire C18 2.1 mm×50 mm column with a 3.5 µm particle size; the mobile phase is 75% methanol/25% water at a flow rate of 0.25 mL/minute). The amount of DCP in the sample solution measured after 2 minutes at 100° C. is referred to as the initial DCP amount.

The Retained Dicumyl Peroxide (DCP) Percentage is calculated in accordance with the following Equation (1A):

$$\text{Retained } DCP \text{ Percentage (\%)} = \left( \frac{\text{wt \% } DCP \text{ at time} = t \text{ hours}}{\text{wt \% } DCP \text{ at time} = 2 \text{ min}} \right) \times 100 \quad \text{Equation (1A)}$$

wherein t=0.5 hours, 1.0 hours, 1.5 hours, or 2.0 hours.

For example, after heating at 100° C. for 2 hours, Solution 1 contains 0.1615 wt % DCP. The initial amount of DCP (i.e., after 2 minutes at 100° C.) in Solution 1 is 1.9880 wt %. Thus, the Retained DCP Percentage of Solution 1 after heating at 100° C. for 2 hours is calculated in accordance with the following Equation (1B):

$$\text{Retained } DCP \text{ Percentage Solution 1 (\%)} = \left( \frac{0.1615 \text{ wt \%}}{1.9880 \text{ wt \%}} \right) \times 100. \quad \text{Equation (1B)}$$

The Retained DCP Percentage of Solution 1 after heating at 100° C. for 2 hours is 8.12%.

The properties of the Sample Solutions and Comparative Solutions are provided in Table 2 below.

TABLE 2

|  | Triphenyl-phosphine wt % (mol %) | tri(cyclohexyl) phosphine wt % (mol %) | tri(n-octyl) phosphine wt % (mol %) | tri(p-tolyl) phosphine wt % (mol %) | tris(2-furyl) phosphine wt % (mol %) | dicumyl peroxide (DCP) wt % (mol %) | dodecylbenzene sulfonic acid (DBSA) wt % (mol %) |
|---|---|---|---|---|---|---|---|
| CS 1 | — | — | — | — | — | 2.0080 (1.2950) | 0.0738 (0.0388) |
| CS 2 | — | — | — | — | — | 1.9511 (1.2382) | — |
| Solution 1 | 0.0048 (0.0033) | — | — | — | — | 1.9880 (1.2622) | 0.0738 (0.0388) |
| Solution 2 | 0.0095 (0.0065) | — | — | — | — | 2.0296 (1.2889) | 0.0738 (0.0388) |
| Solution 3 | 0.0191 (0.0131) | — | — | — | — | 2.0425 (1.2972) | 0.0738 (0.0388) |
| Solution 4 | 0.0286 (0.0196) | — | — | — | — | 2.0361 (1.2931) | 0.0738 (0.0388) |
| Solution 5 | 0.0477 (0.0327) | — | — | — | — | 1.9744 (1.2537) | 0.0738 (0.0388) |
| Solution 6 | 0.1000 (0.0655) | — | — | — | — | 1.9070 (1.2109) | 0.0738 (0.0388) |
| Solution 7 | 0.4978 (0.3263) | — | — | — | — | 1.9558 (1.2438) | 0.0735 (0.0387) |
| Solution 8 | 0.9903 (0.6504) | — | — | — | — | 1.9796 (1.2613) | 0.0731 (0.0386) |
| Solution 9 | — | 0.0089 (0.0061) | — | — | — | 2.0013 (1.2707) | 0.0738 (0.0388) |
| Solution 10 | — | 0.050 (0.0306) | — | — | — | 1.9585 (1.2436) | 0.0738 (0.0388) |
| Solution 11 | — | 0.100 (0.0612) | — | — | — | 1.9475 (1.2368) | 0.0738 (0.0388) |
| Solution 12 | — | — | 0.0066 (0.0046) | — | — | 1.8774 (1.1915) | 0.0739 (0.0388) |
| Solution 13 | — | — | 0.050 (0.0232) | — | — | 1.8581 (1.1795) | 0.0739 (0.0389) |
| Solution 14 | — | — | 0.100 (0.0464) | — | — | 1.8691 (1.1869) | 0.0739 (0.0388) |
| Solution 15 | — | — | — | 0.0082 (0.0056) | — | 1.9355 (1.2287) | 0.0739 (0.0388) |
| Solution 16 | — | — | — | 0.050 (0.0282) | — | 2.0048 (1.2732) | 0.0738 (0.0388) |
| Solution 17 | — | — | — | 0.100 (0.0564) | — | 2.0038 (1.2729) | 0.0738 (0.0388) |
| Solution 18 | — | — | — | — | 0.0108 (0.0074) | 1.8144 (1.1513) | 0.0740 (0.0389) |
| Solution 19 | — | — | — | — | 0.0539 (0.0370) | 1.8360 (1.1652) | 0.0739 (0.0388) |
| Solution 20 | — | — | — | — | 0.100 (0.0739) | 1.9559 (1.2420) | 0.0738 (0.0388) |

|  |  | Dodecane wt % (mol %) | Total wt % (mol %) | Retained DCP Percentage (%) | | | |
|---|---|---|---|---|---|---|---|
|  |  |  |  | 0.5 hours @100° C. | 1.0 hours @100° C. | 1.5 hours @100° C. | 2.0 hours @100° C. |
|  | CS 1 | 97.9182 (98.6861) | 100 (100) | 50.43 | 18.64 | 5.70 | 0.44 |
|  | CS 2 | 98.0489 (98.7618) | 100 (100) | 100 | 100 | 100 | 100 |
|  | Solution 1 | 97.9335 (98.6956) | 100 (100) | 64.64 | 28.21 | 15.02 | 8.12 |
|  | Solution 2 | 97.8870 (98.6657) | 100 (100) | 68.29 | 34.76 | 21.06 | 12.59 |
|  | Solution 3 | 97.8646 (98.6510) | 100 (100) | 85.55 | 64.87 | 53.64 | 44.97 |
|  | Solution 4 | 97.8615 (98.6485) | 100 (100) | 94.55 | 86.02 | 83.29 | 81.90 |
|  | Solution 5 | 97.9041 (98.6748) | 100 (100) | 99.54 | 98.10 | 97.73 | 100 |
|  | Solution 6 | 97.9191 (98.6848) | 100 (100) | 100 | 100 | 100 | 100 |
|  | Solution 7 | 97.4728 (98.3911) | 100 (100) | 98.32 | 100 | 100 | 100 |
|  | Solution 8 | 96.9570 (98.0498) | 100 (100) | 100 | 93.23 | 100 | 100 |
|  | Solution 9 | 97.9160 (98.6843) | 100 (100) | 63.33 | 35.18 | 19.79 | 16.17 |

TABLE 2-continued

| | | | | | | |
|---|---|---|---|---|---|---|
| Solution 10 | 97.9177 (98.6870) | 100 (100) | 99.29 | 96.76 | 95.04 | 95.09 |
| Solution 11 | 97.8787 (98.6631) | 100 (100) | 98.72 | 98.04 | 97.76 | 97.75 |
| Solution 12 | 97.0419 (98.7650) | 100 (100) | 75.83 | 47.84 | 29.23 | 24.24 |
| Solution 13 | 98.0179 (98.7584) | 100 (100) | 97.54 | 98.38 | 98.65 | 98.40 |
| Solution 14 | 97.9569 (98.7279) | 100 (100) | 97.48 | 96.82 | 96.67 | 100.0 |
| Solution 15 | 97.9824 (98.7268) | 100 (100) | 72.40 | 50.94 | 35.70 | 30.77 |
| Solution 16 | 97.8714 (98.6597) | 100 (100) | 87.84 | 84.67 | 89.35 | 89.46 |
| Solution 17 | 97.8225 (98.6319) | 100 (100) | 89.05 | 86.68 | 90.09 | 91.19 |
| Solution 18 | 98.1009 (98.8025) | 100 (100) | 52.72 | 23.61 | 10.03 | 7.20 |
| Solution 19 | 98.0400 (98.7589) | 100 (100) | 84.11 | 71.27 | 65.10 | 59.07 |
| Solution 20 | 97.8703 (98.6452) | 100 (100) | 89.06 | 74.47 | 68.73 | 62.80 |

CS 1 is a comparative solution containing (i) dodecane (to simulate the ethylene-based polymer); (ii) dicumyl peroxide (DCP); and (iii) dodecylbenzene sulfonic acid (DBSA)—and no triorganophosphine. As shown in Table 2, CS 1 exhibits a Retained Peroxide (here, DCP) Percentage of only 0.44% after heating at 100° C. for 2 hours. Thus, CS 1 does not retain a suitable concentration of organic peroxide after heating at 100° C. for 2 hours to enable crosslinking of the composition. Consequently, CS 1 is representative of a peroxide-containing polymer composition that is not suitable for wire and cable applications, as well as other applications.

CS 2 is a comparative composition containing (i) dodecane (to simulate the ethylene-based polymer) and (ii) dicumyl peroxide (DCP)—and no triorganophosphine or DBSA. Thus, CS 2 lacks a protic acid-source compound (PASC) that causes ionic decomposition of the DCP.

Applicant unexpectedly found that a composition (Solutions 1-20) containing (i) dodecane (to simulate the ethylene-based polymer); (ii) dicumyl peroxide (DCP); (iii) a triorganophosphine (triphenylphosphine, tri(p-tolyl)phosphine, tri(cyclohexyl)phosphine, tri(n-octyl)phosphine, or tris(2-furyl)phosphine); and (iv) dodecylbenzene sulfonic acid (DBSA) advantageously exhibits a Retained Peroxide (here, DCP) Percentage of greater than 8%, and in some cases, greater than 98%, after heating at 100° C. for 2 hours. Consequently, Solutions 1-20 are representative of peroxide-containing polymer compositions that are suitable for wire and cable applications, as well as other applications.

Ethylene-Based Polymer Compositions

Masterbatches of additives in an ethylene-based polymer (low density polyethylene; LDPE; 0.921 g/cc, 2 g/10 min melt index measured at 190° C. with 2.16 kg load) are prepared using a 420 mL BRABENDER™ mixing bowl at 180° C., 30 revolutions per minute (rpm), with cam rotors, total mixing time of 5 minutes from the time of loading. The composition of each masterbatch (MB) is shown in Table 3 below.

TABLE 3

Masterbatches

| | wt % (wt % based on total weight MB) | | |
|---|---|---|---|
| | DSTDP MB | TPP MB | Uvinul 4050 MB |
| LDPE | 99.0 | 99.0 | 99.0 |
| Cyanox STDP Distearyl Thiodipropionate (DSTDP) | 1.0 | | |
| Triphenyl phosphine (TPP) | | 1.0 | |
| Uvinul 4050 FF (hindered amine light stabilizer, HALS) | | | 1.0 |
| Total | 100.0 | 100.0 | 100.0 |

A "solids" mixture of the ingredients is made in a container, and this "solids" mixture is subsequently loaded in the Brabender mixing bowl and melt-mixed to prepare the MB. The polymer melt is taken out of the mixing bowl, flattened to solid form in a cool press, cut into small strips using a guillotine plaque cutter, and then pelletized into small pieces using a BERLYN™ pelletizer. The small pieces are fed to a BRABENDER™ single screw extruder operating with a conventional conveying screw at 40 rpm, with a set barrel temperature of 130° C. across all zones and the head/die. The resulting polymer strand is cut into uniform pellets using the BERLYN™ pelletizer, to make pellets of the MB.

Next, the masterbatches are melt mixed with the same LDPE as mentioned above, in the proportions shown in Table 4, using a twin-screw extruder at 60 rpm with all zones set at 120° C. (resulting in melt temperature of about 140° C.) and 60 mesh screenpack, to make strands that are converted to pellets of "intermediate" compounds.

TABLE 4

"Intermediate" Compounds

|  | wt % (wt % based on total weight intermediate compound) | | | | |
| --- | --- | --- | --- | --- | --- |
|  | LDPE + 0.25 wt % DSTDP + 0.005 wt % TPP | LDPE + 0.25 wt % DSTDP + 0.01 wt % TPP | LDPE + 0.25 wt % DSTDP + 0.10 wt % TPP | LDPE + 0.25 wt % DSTDP + 0.50 wt % TPP | LDPE + 0.25 wt % DSTDP + 0.005 wt % Uvinul 4050 |
| LDPE | 74.03 | 73.52 | 64.36 | 23.62 | 74.03 |
| DSTDP MB | 25.46 | 25.46 | 25.46 | 25.46 | 25.46 |
| TPP MB | 0.51 | 1.02 | 10.18 | 50.92 | |
| Uvinul 4050 MB | | | | | 0.51 |
| Total | 100.00 | 100.00 | 100.00 | 100.00 | 100.00 |

Next, 1.8 g of an organic peroxide is soaked into 98.2 g of each "intermediate" compound, to make "fully-formulated" compounds of the compositions shown in Table 5. In Inventive Compounds 1 to 5, DSTDP functions as a PAGC.

TABLE 5

"Fully Formulated" Compounds and MH after Prolonged Storage at 70° C.

|  | Inventive Compound 1 | Inventive Compound 2 | Inventive Compound 3 | Inventive Compound 4 | Comparative Compound |
| --- | --- | --- | --- | --- | --- |
|  | wt % (wt % based on total weight fully formulated compound) | | | | |
|  | LDPE + 1.8 wt % DCP + 0.25 wt % DSTDP + 0.005 wt % TPP | LDPE + 1.8 wt % DCP + 0.25 wt % DSTDP + 0.01 wt % TPP | LDPE + 1.8 wt % DCP + 0.25 wt % DSTDP + 0.10 wt % TPP | LDPE + 1.8 wt % DCP + 0.25 wt % DSTDP + 0.50 wt % TPP | LDPE + 1.8 wt % DCP + 0.25 wt % DSTDP + 0.005 wt % Uvinul 4050 |
| LDPE | 72.70 | 72.20 | 63.20 | 23.19 | 72.70 |
| DSTDP MB | 25.00 | 25.00 | 25.00 | 25.00 | 25.00 |
| TPP MB | 0.50 | 1.00 | 10.00 | 50.00 | |
| Uvinul 4050 MB | | | | | 0.50 |
| Perkadox BC-FF Dicumyl Peroxide (DCP) | 1.80 | 1.80 | 1.80 | 1.80 | 1.80 |
| Total | 100.00 | 100.00 | 100.00 | 100.00 | 100.00 |
| MH (lb in) at 180° C. - after 21 days at 70° C. | 3.71 | 3.77 | 3.78 | 3.65 | 3.54 |
| Retained MH | 100% | 100% | 100% | 100% | 100% |

In Table 5 above, the Retained MH Percentage is calculated in accordance with the following Equation (2):

$$\text{Retained } MH \text{ Percentage (\%)} = \left( \frac{MH \text{ at time} = t\, 21 \text{ days}}{MH \text{ at time} = t\, 0 \text{ hr}} \right) \times 100 \quad \text{Equation (2)}$$

wherein t=21 days at 70° C.

By way of example, the Retained MH percentage for Inventive Compound 1 is calculated in accordance with the following Equation (2A):

$$\text{Retained } MH \, (\%) = \left( \frac{3.7 \text{ lb in @ } t = 21 \text{ days}}{3.7 \text{ lb in @ } t = 0 \text{ hrs}} \right) \times 100. \text{ (retention after 21 days)} \quad \text{Equation (2A)}$$

The Retained MH % for Inventive Compound 1 is 100%. After aging at 70° C. for 21 days, fully formulated compounds 1,2,3, and 4 each exhibit 100% Retained MH.

Bounded by no particular theory, it is believed that oxidation byproducts of DSTDP form acidic species, which can cause non-productive non-free radical decomposition of the peroxide crosslinking agent. This type of deleterious effect is taught in patent application WO2016204951A1, which shows that: (a) DSTDP can have a deleterious effect on retained degree of crosslinking (as measured by maximum torque, MH, using a moving die rheometer) after prolonged storage at an elevated temperature of 70° C.; and (b) that the inclusion of Uvinul 4050 improves the retention of MH over time at an elevated temperature of 70° C.

In Table 5 above, the Comparative Compound contained Uvinul 4050. Although Inventive Compounds 1 to 4 did not contain Uvinul 4050, they still exhibited the same degree, or a higher degree, of crosslinking after prolonged storage at 70° C. The Retained MH values reflect the amount of peroxide present in the formulation at the time of the test, with greater values of MH corresponding to more peroxide being present. Each of Inventive Compounds 1-4 exhibited 100% Retain MH indicating all, or substantially all, the peroxide remains present in the inventive compositions.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A composition comprising:
   (i) an ethylene-based polymer, wherein the ethylene-based polymer is from 23.19 wt % to 90 wt % based on the total weight of the composition;
   (ii) an organic peroxide;
   (iii) a triorganophosphine having a Structure (1):

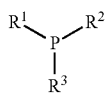

Structure (1)

wherein $R^1$, $R^2$, and $R^3$ each is independently selected from the group consisting of a $C_1$-$C_{40}$ hydrocarbyl group, a $C_1$-$C_{40}$ heterohydrocarbyl group, and combinations thereof;

with the proviso that the phosphorus atom is bound to a carbon atom in each of $R^1$, $R^2$, and $R^3$; and (iv) a protic acid-source compound ("PASC") selected from the group consisting of a protic acid, a protic acid-generator compound ("PAGC"), and combinations thereof.

2. The composition of claim 1, wherein the PASC is the protic acid; and the composition has a Retained Peroxide Percentage from 70% to 100% after heating at 100° C. for 2 hours.

3. The composition of claim 1, wherein the PASC is the protic acid, and the protic acid is selected from the group consisting of a sulfonic acid, a sulfenic acid, a sulfinic acid, a carboxylic acid, a phosphorus-based acid, and a combination thereof.

4. The composition of claim 1 wherein the PASC is the PAGC, and the PAGC comprises an antioxidant (AO).

5. The composition of claim 4 wherein the AO is a sulfur-based antioxidant.

6. The composition of claim 1, wherein $R^1$, $R^2$, and $R^3$ each is independently selected from the group consisting of a phenyl group, a p-tolyl group, a 2-furyl group, a cyclohexyl group, and an n-octyl group.

7. The composition of claim 6, wherein $R^1$, $R^2$, and $R^3$ are the same.

8. The composition of claim 1, wherein the organic peroxide is dicumyl peroxide.

9. The composition of claim 1, wherein the composition comprises from greater than 0.001 wt % to 1.0 wt % of the triorganophosphine having the Structure (1), based on the total weight of the composition; and
$R^1$, $R^2$, and $R^3$ each is a phenyl group.

10. The composition of claim 1, wherein the composition comprises from 0.001 wt % to 1.0 wt % of the triorganophosphine having the Structure (1), based on the total weight of the composition; and
$R^1$, $R^2$, and $R^3$ each is a p-tolyl group.

11. The composition of claim 1, wherein the composition comprises from 0.001 wt % to 1.0 wt % of the triorganophosphine having the Structure (1), based on the total weight of the composition; and
$R^1$, $R^2$, and $R^3$ each is a 2-furyl group.

12. The composition of claim 1, wherein the composition comprises from 0.001 wt % to 1.0 wt % of the triorganophosphine having the Structure (1), based on the total weight of the composition; and
$R^1$, $R^2$, and $R^3$ each is a cyclohexyl group or is an n-octyl group.

13. The composition of claim 1, wherein the PASC is a PAGC; and
the composition has a Retained MH of 100% after heating at 70° C. for 21 days.

14. A crosslinked product made by heating the composition of claim 1 to a temperature sufficient to crosslink the composition.

15. A coated conductor comprising:
   a conductor; and
   a coating on the conductor, the coating comprising the composition of the crosslinked product of claim 14.

16. A coated conductor comprising:
   a conductor; and
   a coating on the conductor, the coating comprising the composition of claim 1.

17. The composition of claim 1 comprising from 45 wt % to 90 wt % of the ethylene-based polymer.

* * * * *

UNITED STATES PATENT AND TRADEMARK OFFICE
CERTIFICATE OF CORRECTION

| | | |
|---|---|---|
| PATENT NO. | : 11,840,616 B2 | Page 1 of 1 |
| APPLICATION NO. | : 17/273632 | |
| DATED | : December 12, 2023 | |
| INVENTOR(S) | : Chaudhary et al. | |

It is certified that error appears in the above-identified patent and that said Letters Patent is hereby corrected as shown below:

On the Title Page

Column 1 Item (22) PCT Filed: Replace "Sep. 19, 2019" with --Sep. 12, 2019--

Signed and Sealed this
Twenty-third Day of April, 2024

Katherine Kelly Vidal
*Director of the United States Patent and Trademark Office*